United States Patent

Pongracz

[11] Patent Number: 5,506,926
[45] Date of Patent: Apr. 9, 1996

[54] OPTICAL FIBER MANAGEMENT APPARATUS

[75] Inventor: David J. Pongracz, Bangor, Pa.

[73] Assignee: AT&T Corp., Murray Hill, N.J.

[21] Appl. No.: 318,949

[22] Filed: Oct. 6, 1994

[51] Int. Cl.⁶ ........................................... G02B 6/00
[52] U.S. Cl. ................................ 385/135; 385/147
[58] Field of Search .................... 385/135, 134, 385/147

[56] References Cited

U.S. PATENT DOCUMENTS

| 4,276,332 | 6/1981 | Castle | 428/36 |
| 4,687,289 | 8/1987 | DeSanti | 385/135 |
| 4,932,744 | 6/1990 | Messelhi | 385/135 |
| 5,169,716 | 12/1992 | Croft et al. | 428/379 |
| 5,363,467 | 11/1994 | Keith | 385/135 |
| 5,367,598 | 11/1994 | Devenish, III et al. | 385/135 |

*Primary Examiner*—Akm L. Ullah
*Attorney, Agent, or Firm*—Lester H. Birnbaum

[57] ABSTRACT

Disclosed is an apparatus for holding optical fibers which are optically connected to a row of devices such as circuit packs. The apparatus includes a tray adapted for mounting in close proximity to the row of devices. A wire-formed element is mounted in a front portion of the tray. The element includes a series of tabs with spaces therebetween where any fiber can be brought out of the tray for connection to any of the devices.

6 Claims, 1 Drawing Sheet

OPTICAL FIBER MANAGEMENT APPARATUS

BACKGROUND OF THE INVENTION

This invention relates to apparatus for storing and routing optical fibers.

Many optical and electrical systems require the presence of a great plurality of optical fibers, which, if not properly managed, can become damaged since optical fibers require a minimum bend radius and protection from sharp edges for proper operation. For example, in digital loop carrier systems such as the Subscriber Loop Carrier (SLC®) system, circuit packs are usually arranged in a shelf including 27 circuit packs, and several circuit packs may include at least two ports for connection to optical fibers from a cable. In the future of the electronic superhighway, the demand for optical fiber connections in such systems should increase substantially.

At present, such systems usually employ a tray which is mounted to the bottom of a row of circuit packs. The tray includes a front recessed portion for holding the fibers which are to be connected to the circuit packs or which are to be fed through to an adjacent row of circuit packs. Each fiber is brought up from the recessed portion for connection to a corresponding circuit pack through an aligned hole in the tray, which hole includes a grommet around the interior surface to protect the fiber. A problem exists in such systems since the grommets and the fibers have a tendency to fall out of the holes. Alternatively, "fishhooks" (rotating metal hooks) attached to the front of the tray have been used to hold the fibers. Such "fishhooks" were difficult to handle.

SUMMARY OF THE INVENTION

The invention is an apparatus for storing and routing a plurality of optical fibers connected to a row of devices. The apparatus comprises a tray including a front recessed portion. A wire-formed element is mounted within the recessed portion. The element includes a passageway for the optical fibers and a plurality of tabs extending from at least one side of the passageway with spaces between the tabs. The tabs hold the fibers in the passageway and permit any one of said fibers to extend through a space for connection with any one of the devices.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION OF THE INVENTION

Figure 1:
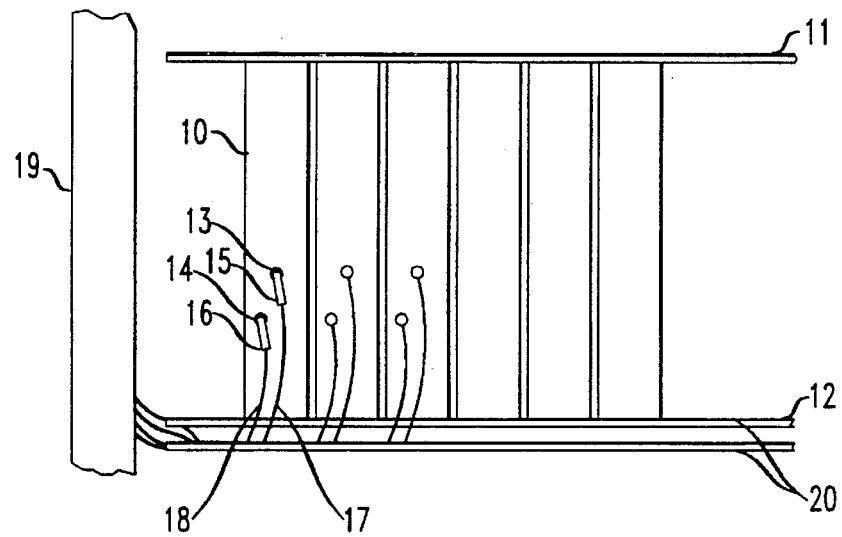
FIG. 1 is a front view of a system incorporating the invention in accordance with one embodiment.

FIG. 1 illustrates a typical system requiring apparatus for organizing optical fibers. The particular system shown is a portion of a Subscriber Loop Carrier (SLC®) system where a plurality of circuit packs, e.g., 10, are mounted within a standard shelf having top and bottom surfaces, 11 and 12, respectively. For the purposes of illustration, only a portion of the circuit packs are shown. Each circuit pack, e.g., 10, includes two jacks, 13 and 14, for receiving optical connectors, 15 and 16, which are connected to corresponding optical fibers, 17 and 18, emanating from an input fiber cable, 19. The fibers, e.g., 17 and 18, from the cable, 19, are held within a tray, 20, which is mounted to the bottom surface 12, of the shelf and is essentially parallel thereto. The tray is typically mounted by means of screws.

It will be appreciated that the primary function of the tray, 20, is to route the fibers in an organized fashion to their corresponding circuit packs in the shelf or in adjacent shelves. This function is achieved in accordance with the invention by the structure illustrated in FIGS. 2, 3 and 4.

Figure 2:
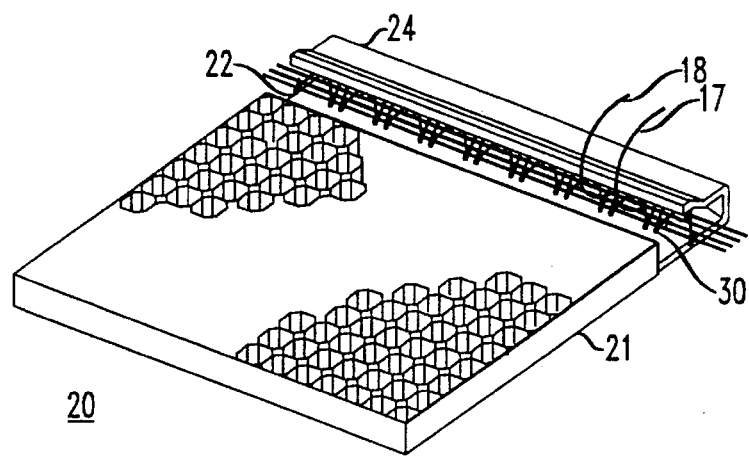
FIG. 2 is a perspective view of a portion of the apparatus of FIG. 1.

As illustrated in FIG. 2, the tray, 20, comprises an essentially flat sheet, 21, of metal such as steel. The front of the tray includes a recessed portion, 22, which runs the full length of the tray. The front of the tray also includes portion, 24, which overhangs part of the width of the recessed portion, 22.

Figure 3:
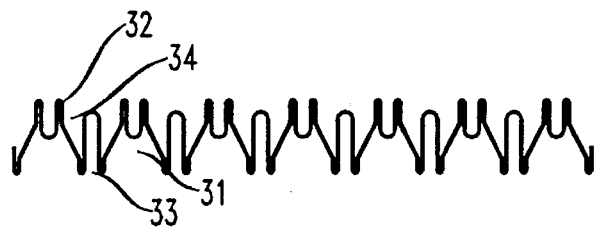
FIG. 3 is a top view of a portion of the apparatus of FIGS. 1 and 2.
Figure 4:
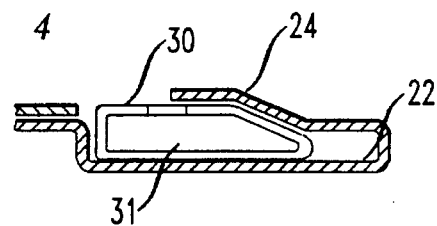
FIG. 4 is a side view of a portion of the apparatus of FIGS. 1 and 2.

Inserted within the recessed portion, 22, and held therein by the overhang portion, 24, is a wire-formed element, 30, which is shown in more detail in FIGS. 3 and 4. The element, 30, is formed from a single piece of wire such as steel 0.045 inch diameter wire. The wire should be stiff enough so that it holds its shape during handling and when inside the recess. A plurality of such elements can be placed end-to-end in the recess, 22, but only one-element is illustrated. The element is shaped so as to produce an open longitudinal passageway, 31, for the optical fibers. Extending from both sides of the passageway at line top surface thereof are series of tab portions, e.g., 32 and 33, which overlap in the longitudinal direction so as to contain the fibers in the passageway. Spaces, e,g., 34, are formed between the two sets of tabs, e.g., 32 and 33, in the longitudinal direction. Typically, the spaces have a width in the range 25 to 26 mm. In this example, the set of tabs, e.g., 33 extending from one side of the element (the bottom side in FIG. 3) are longer than the set of tabs extending from the opposite side to provide proper retention in the tray.

Returning to FIG. 2, it will be appreciated that when one or more elements, 30, are inserted in the recess, 22, the set of fibers, e.g., 17 and 18, which are to be connected to the circuit packs (e.g., 10 of FIG. 1) of the shelf can be placed in the passageway, 31, of the elements by snaking the fibers around the tabs, e.g., 32 and 33. Any fiber, e.g., 18, can extend out of the passageway at any point along the passageway through one of the spaces, e.g., 34, between the tabs for connection to its associated circuit pack. Since the fibers extending from the tray are only in contact with the curved surfaces of the wire-formed element, 30, no separate protection parts, such as grommets, are needed. Also, the minimum bend-radius of each fiber is preserved by the spacing of the tabs of the wire-formed element. Fibers which are to be connected to an adjacent shelf can run through the entire length of the passageway to a tray (not shown) mounted below that shelf. Thus, the fibers are stored and routed in an organized fashion.

Various modifications of the embodiment shown are possible. For example, the tray, 21, can be mounted above or on the sides of a shelf of circuit packs rather than below the shelf. All such variations which basically rely on the teachings through which the invention has advanced the art are properly considered within the scope of the invention.

I claim:

1. Apparatus for storing and routing a plurality of optical fibers connected to a row of devices comprising:

a tray including a front recessed portion; and a wire-formed element mounted within the recess, said element comprising a passageway for the optical fibers and a plurality of tabs positioned along the longitudinal direction of the passageway and extending from at least one side of the passageway with spaces between the tabs such that the tabs hold the fibers in the passageway and permit any one of the fibers to extend through a space for connection with any one of the devices.

2. Apparatus according to claim 1 wherein the devices comprise circuit packs mounted within a shelf and the tray is mounted to the shelf.

3. Apparatus according to claim 2 wherein the tray is mounted to a bottom portion of the shelf.

4. Apparatus according to claim 1 wherein the element includes tabs extending from two sides of the passageway which overlap in the longitudinal direction of the passageway.

5. Apparatus according to claim 4 wherein the tabs extending from one side of the passageway are longer than the tabs extending from the other side.

6. Apparatus according to claim 1 wherein the element is formed from a wire comprising steel.

* * * * *